R. VON LIEBEN, E. REISZ & S. STRAUSS.
DISCHARGE TUBE.
APPLICATION FILED JUNE 29, 1912.
1,169,082.  Patented Jan. 18, 1916.
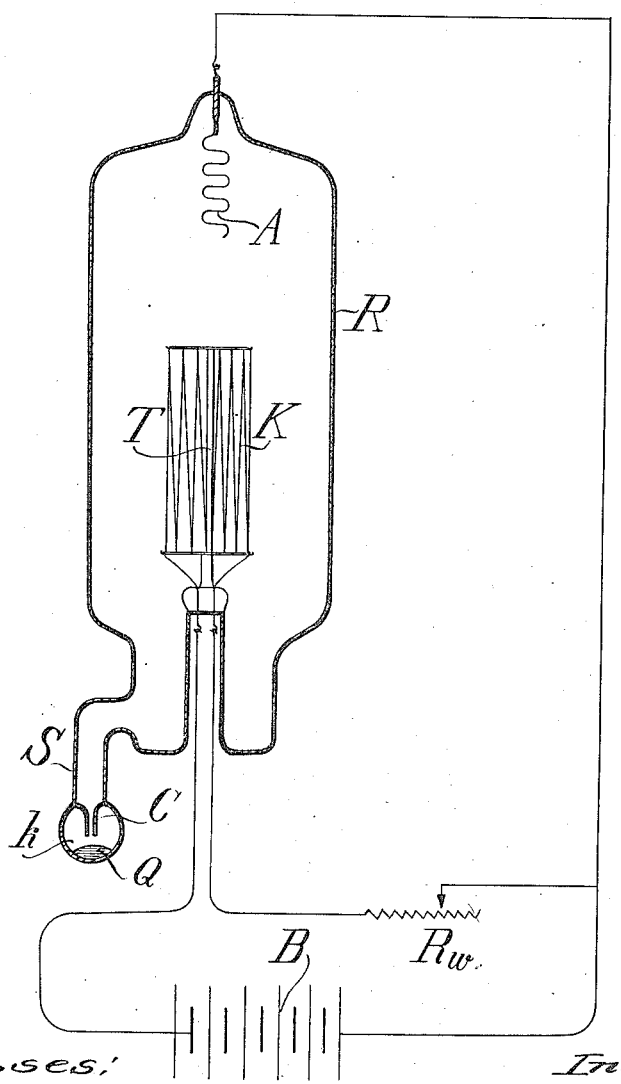
Witnesses:
Inventors
Robert von Lieben
Eugen Reisz
Siegmund Strauss
by
James L. Norris
Atty

UNITED STATES PATENT OFFICE.

ROBERT VON LIEBEN, EUGEN REISZ, AND SIEGMUND STRAUSS, OF VIENNA, AUSTRIA-HUNGARY, ASSIGNORS TO THE FIRM OF RELAIS-GESELLSCHAFT M. B. H., OF VIENNA, AUSTRIA-HUNGARY.

DISCHARGE-TUBE.

1,169,082.    Specification of Letters Patent.    Patented Jan. 18, 1916.

Application filed June 29, 1912. Serial No. 706,760.

*To all whom it may concern:*

Be it known that we, ROBERT VON LIEBEN, EUGEN REISZ, and SIEGMUND STRAUSS, all subjects of the Emperor of Austria-Hungary, residing at Vienna, Austria-Hungary, have invented certain new and useful Improvements in Discharge-Tubes, of which the following is a specification.

This invention relates to discharge tubes especially of the kind having an incandescent metallic oxid cathode, and has for its object to increase their duration, uniformity and the economical advantages generally.

It is a well known fact that exhausted discharge tubes can be worked only for a comparatively short time as the discharge ceases after a short period if it is continuously maintained for some time. The use of such discharge tubes has therefore been mainly confined to medical and photographic purposes where constant working is not required. It has also been proposed, for instance as disclosed in Patent No. 1,038,910, to use such discharge tubes for relay purposes, especially for telephonic relays or for a telegraphone, a cell sensitive to light, etc., where constant working is required and which would hardly be possible with discharge tubes hitherto known, as the cost as well as the amount of work in renewing the discharge tubes would be too great.

The object of the present invention, therefore, is to provide means whereby the duration of the discharge can be maintained for a greater period than heretofore possible so as to render the discharge tubes of the character specified practically sufficient in their service for relay purposes and especially for telephonic relays or for telegraphones and other uses where a prolonged discharge is desirable. Furthermore the working of discharge tubes as heretofore organized was not uniform enough for use as a relay, as the discharge or the flow of current is commonly subject to variations due to irregularities in the discharge.

A further object of this invention is to provide means whereby such irregularities can be avoided and a uniform discharge maintained during the whole life of the tube.

The causes for the above mentioned phenomena have been investigated and it was found that the conduction of electricity in a tube or the discharge is dependent upon the occlusion of the gas molecules, the resistance in the tube increasing very rapidly as the occlusion progresses. The resistance at last reaches a value which cannot be overcome by the pressure applied to the electrodes, whereby the discharge which is diminished with increasing resistance of the tube finally ceases completely after a comparatively short time. In addition to the inconvenience above specified a high voltage is also necessary to maintain the discharge. The use of high voltages may be avoided by employing what are known as Wehnelt-cathodes, which consist of metal strips covered with metallic oxids that are rendered incandescent by the passage of a current which is well known in the art. The present invention is especially effective or useful in connection with this particular form of cathode as the discharge potential is still further lowered and consequently the best results may be obtained in connection with the said cathodes.

All discharge tubes which work with diluted gases have the property that through continuous passage of the current the gas pressure becomes less and is subjected to great fluctuations by the irregular occlusion of gas on the electrodes and glass walls. At present the cathode fall, which as is known represents the main resistance for the passage of the current is a function of the gas pressure, involves a continuous change in value of current strength at constant tension. As a consequence of this condition it is necessary to continuously regulate the gas pressure in order to maintain an equilibrium in the discharge of the gas tube or maintenance of a constant current value.

It is the purpose of this invention to overcome and remedy the foregoing disadvantage by introducing in the discharge space diluted gas metal vapors in addition to the usual gas, the ionizing tension of said diluted gas metal vapors being less than that of the gas so that the vapors constitute the greater medium for the conduction of current. The occlusion, as is known, depends upon the number of moved gas ions and under the circumstances of introducing the diluted gas metal vapors, as just stated, is reduced to such an extent that the current strength in the discharge tube remains practically unchanged for a long period of time. It has also been ascertained that in discharge tubes with glowing metal oxid cathodes, or Wehnelt-cathodes, metal vapors amounting to 0.001 mm. of mercury for instance, are sufficient to conduct the current, that is, at this vapor pressure the number of moved gas ions and therewith the occlusion of the same is materially reduced. Liquid mercury has at 70° F. a pressure of 0.001 mm., and in accordance with the features of the invention this metal is lodged in an extension of the discharge tube which is exposed to the temperature of the room in which the tube is located. When discharge tubes operating with gas and vapor filling are installed in rooms having a temperature higher than 70° F., a vapor furnishing substance is employed, said substance preferably being amalgams of mercury which at the same temperature have smaller vapor pressure than pure mercury so that at higher temperatures the desired pressure of 0.001 mm. is obtained. The same object is also obtained with pure mercury when the latter is precipitated in very thin layers on the glass wall, because in the latter case the molecular attraction or adhesion reduces the vapor pressure of the mercury.

The method for accomplishing the above named objects consists in bringing an electropositive substance into the discharge tube or into some chamber or room connected thereto, the vapors of which substance partly or wholly effect this conduction. The pressure of these vapors can be regulated by varying the temperature of this substance, which will in the following be referred to as the auxiliary substance. As it has been pointed out, by means of this electropositive substance the conduction of electricity which hitherto has been carried out only by the gas molecules is now effected by these vapors (for instance metal vapors). By conveniently selecting the auxiliary substance in question the resistance of the discharge tube can be considerably diminished, owing to the low discharge potential and to the low ionizing voltage of the auxiliary substance which is preferably a metal capable of developing vapors under the given conditions. The molecules of the metal vapors are, in comparison with gases, by far less subject to occlusion, and, therefore, the pressure in the discharge tube remains constant for an interval of time which is nearly indefinite. This constant pressure is furthermore secured by the auxiliary substance itself the temperature of which is equal to that of the coolest place in the tube.

Now, the applicants are well aware that in this respect there is some analogy with the working of the well known mercury arc lamps, but it is obvious that there is a great difference in that the conduction is not effected by the metal vapors alone but also by the gas remaining in the discharge tube and that the cathode drop is not diminished by the mercury evaporated by the heat of the arc, but by the use of a cathode of metallic oxids. Thus no such great current intensity and no such great pressures and high temperatures occur, as are necessary in a mercury arc lamp to maintain the discharge by means of an arc, the formation of the arc being even prevented by a convenient construction of the whole arrangement. By these means, that is to say by the auxiliary use of metal vapors, a discharge of considerable duration can be maintained with a very little current intensity and pressure of the vapor, whereby a much greater effect can be obtained than by the constructions heretofore known.

In the drawing the discharge tube is represented as being provided with special means for storing the auxiliary substance.

T is the carrier of the metallic oxid cathode K, which is arranged in the well known way of a metal filament lamp. An anode A, consisting in the present instance of a loop filament or element, is disposed in the tube as shown and performs the usual function of devices of this class. The temperature of this cathode can be regulated by means of the resistance $R_w$.

S is a tubular piece projecting from the discharge tube, wherein for example mercury or some amalgam Q is placed as an auxiliary substance. The temperature of this auxiliary substance is nearly equal to the temperature of the ambient air, the mercury being situated comparatively distant from the incandescent metallic oxid cathode. By suitable selection of the shape and dimensions of the tubular projection the auxiliary substance can, if necessary, be heated by radiation or conduction from the discharge tube or otherwise. If mercury be used as an auxiliary substance, the discharge of the same is prevented preferably by the interposition of a capillary tube C and by the small bulb $k$ in which the mercury is stored. But it is obvious that the auxiliary substances, for example metals or amalgams of metals, need no special arrangement, but can be precipitated on the walls of the tube in the form of a thin layer. In this case the pressure is diminished owing to the molecular attraction of the walls of the tube and in proportion to the thickness of the layer. Owing to this method, in addition to the regulation of the temperature, a further variation of this pressure can be obtained. The sensitiveness of the arrangements to voltage variations, which is a consequence of the low discharge potential of the metal vapors, renders it particularly appropriate for use in connection with relays for undulatory currents, such as described in U. S. Patents Nos. 1,038,910 and 1,059,736.

Claims:

1. The method of increasing the duration of incandescent metallic oxid cathode discharge tubes having gas therein, consisting in lowering the ionizing and discharge voltages and reducing the occlusion of the gas molecules by operatively exposing the cathode to the vapor of an electro-positive substance, and regulating the pressure by varying the temperature of said substance.

2. The method of increasing the duration of incandescent metallic oxid cathode discharge tubes having gas therein, consisting in lowering the ionizing and discharge voltages and reducing the occlusion of the gas molecules by depositing a thin layer of an electro-positive substance on the wall of the discharge tube to develop a vapor which is exposed to the cathode, and varying the pressure of the vapor by modifying the thickness of the layer.

3. A discharge tube of the character set forth, comprising a metallic oxid cathode and provided with a tubular projection arranged on the tube near the cathode, the said tubular projection terminating in a spherical enlargement having a comparatively low temperature, and a vaporizing electro-positive substance in the enlargement to expose the vapor of said substance to the cathode to lower the ionizing and discharge voltages and reduce the occlusion of the gas molecules.

In testimony whereof we have hereunto set our hands in presence of the subscribing witnesses.

ROBERT von LIEBEN.
EUGEN REISZ.
SIEGMUND STRAUSS.

Witnesses as to Robert von Lieben and Siegmund Strauss:
 JOSEF RUBURCK,
 FRANZ KAMPE.

Witnesses as to Eugen Reisz:
 HENRY HASPER,
 WOLDEMAR HAUPT.